US011945505B2

(12) United States Patent
Willison et al.

(10) Patent No.: US 11,945,505 B2
(45) Date of Patent: Apr. 2, 2024

(54) LAND VEHICLES INCORPORATING IMPACT MANAGEMENT SYSTEMS

(71) Applicant: Workhorse Group Inc., Sharonville, OH (US)

(72) Inventors: Robert Willison, Lebanon, OH (US); Donald L. Wires, Loveland, OH (US); Gary Cain, Loveland, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 18/462,656

(22) Filed: Sep. 7, 2023

(65) Prior Publication Data

US 2023/0415816 A1    Dec. 28, 2023

Related U.S. Application Data

(63) Continuation of application No. 18/106,195, filed on Feb. 6, 2023, now Pat. No. 11,753,078, which is a
(Continued)

(51) Int. Cl.
*B62D 21/00* (2006.01)
*B60K 1/02* (2006.01)
(Continued)

(52) U.S. Cl.
CPC ............... *B62D 21/15* (2013.01); *B60K 1/02* (2013.01); *B60K 7/0007* (2013.01); *B60T 1/02* (2013.01); *B60K 2007/0092* (2013.01)

(58) Field of Classification Search
CPC .......... B62D 21/15; B60K 1/02; B60K 7/007; B60T 1/02
(Continued)

(56) References Cited

U.S. PATENT DOCUMENTS 1,251,749 A    1/1918   Cilley
1,728,889 A    9/1929   Kemble
(Continued)

FOREIGN PATENT DOCUMENTS

CN    103359174 A    10/2013
CN    110884568 A    3/2020
(Continued)

OTHER PUBLICATIONS

International Search Report; International Searching Authority; International Patent Application No. PCT/US2021/012327; dated Mar. 9, 2021; 2 pages.
(Continued)

*Primary Examiner* — Hau V Phan
(74) *Attorney, Agent, or Firm* — Taft Stettinius & Hollister LLP

(57) ABSTRACT

A land vehicle includes a frame structure, a plurality of wheels, and an impact management system. The frame structure includes an operator cage that at least partially defines an operator cabin and a rear compartment positioned rearward of the operator cage in a longitudinal direction. The frame structure includes a pair of rails that each extends in the longitudinal direction from a first end arranged adjacent a pair of front wheels to a second end arranged adjacent a pair of rear wheels. The plurality of wheels are supported by the frame structure. The plurality of wheels includes the pair of front wheels and the pair of rear wheels. The pair of front wheels are positioned forward of the pair of rear wheels in the longitudinal direction.

20 Claims, 11 Drawing Sheets

Related U.S. Application Data continuation of application No. 17/884,526, filed on Aug. 9, 2022, now Pat. No. 11,572,102, which is a continuation of application No. 17/546,641, filed on Dec. 9, 2021, now Pat. No. 11,440,590.

(51) Int. Cl.
  *B60K 7/00* (2006.01)
  *B60T 1/02* (2006.01)
  *B62D 21/15* (2006.01)

(58) Field of Classification Search
  USPC .................................................. 180/65.51
  See application file for complete search history.

(56) References Cited

U.S. PATENT DOCUMENTS

| | | | |
|---|---|---|---|
| 2,172,831 A | 9/1939 | Philip | |
| 2,973,220 A | 2/1961 | White | |
| 3,066,621 A | 12/1962 | Dean et al. | |
| 3,696,732 A | 10/1972 | Rodgers | |
| 4,232,755 A | 11/1980 | Dow | |
| 4,270,622 A | 6/1981 | Travis | |
| 4,676,545 A | 6/1987 | Bonfilio et al. | |
| 4,934,733 A | 6/1990 | Smith et al. | |
| 5,363,939 A | 11/1994 | Catlin | |
| 5,628,438 A | 5/1997 | Legrow | |
| 5,681,057 A | 10/1997 | Whirley et al. | |
| 5,690,378 A | 11/1997 | Romesburg | |
| 5,823,599 A | 10/1998 | Gray | |
| 5,829,542 A | 11/1998 | Lutz | |
| 6,015,198 A | 1/2000 | Stair | |
| 6,893,046 B2 | 5/2005 | Ledesma et al. | |
| 6,926,351 B2 | 8/2005 | Telehowski et al. | |
| 6,954,152 B1 | 10/2005 | Matthews | |
| 7,651,153 B2 | 1/2010 | Martin et al. | |
| 8,641,133 B1 | 2/2014 | Scaringe et al. | |
| 8,651,292 B2 | 2/2014 | Sunderland et al. | |
| 8,714,592 B1 | 5/2014 | Thoreson et al. | |
| 9,103,535 B1 | 8/2015 | Strobel et al. | |
| 10,801,169 B2 | 10/2020 | Roy et al. | |
| 10,967,904 B2 | 4/2021 | Penz et al. | |
| 11,167,798 B1* | 11/2021 | Butukuri | B62D 21/15 |
| 11,220,297 B2 | 1/2022 | Willison | |
| 11,383,715 B2 | 7/2022 | Willison et al. | |
| 11,440,456 B1 | 9/2022 | Willison et al. | |
| 11,440,590 B1* | 9/2022 | Willison | B62D 21/15 |
| 11,572,102 B1* | 2/2023 | Willison | B62D 21/152 |
| 11,753,078 B2* | 9/2023 | Willison | F16D 63/006 180/65.51 |
| 2003/0230443 A1* | 12/2003 | Cramer | B62D 21/152 180/65.51 |
| 2006/0158024 A1 | 7/2006 | Wendl | |
| 2006/0273571 A1 | 12/2006 | Matsumoto et al. | |
| 2007/0257570 A1 | 11/2007 | Walter et al. | |
| 2008/0003321 A1 | 1/2008 | Kerr et al. | |
| 2009/0032321 A1 | 2/2009 | Marsh et al. | |
| 2010/0025132 A1 | 2/2010 | Hill et al. | |
| 2010/0101900 A1 | 4/2010 | Usui | |
| 2010/0108417 A1 | 5/2010 | Gilmore | |
| 2010/0263954 A1 | 10/2010 | Constans | |
| 2011/0017527 A1 | 1/2011 | Oriel et al. | |
| 2012/0175916 A1* | 7/2012 | Rawlinson | B62D 25/20 296/203.02 |
| 2013/0241237 A1 | 9/2013 | Dziuba et al. | |
| 2013/0341971 A1 | 12/2013 | Masini et al. | |
| 2014/0054916 A1 | 2/2014 | Knudtson et al. | |
| 2014/0083606 A1 | 3/2014 | Masini et al. | |
| 2014/0159468 A1 | 6/2014 | Heinen et al. | |
| 2014/0182954 A1 | 7/2014 | Weber | |
| 2015/0027795 A1 | 1/2015 | Hirai et al. | |
| 2015/0291017 A1 | 10/2015 | LaBiche | |
| 2017/0050514 A1 | 2/2017 | Li | |
| 2017/0113716 A1 | 4/2017 | Gong et al. | |
| 2017/0225715 A1* | 8/2017 | Kobayashi | B60L 50/64 |
| 2017/0305253 A1 | 10/2017 | Perlo et al. | |
| 2018/0037151 A1 | 2/2018 | Bauer et al. | |
| 2018/0108891 A1 | 4/2018 | Fees et al. | |
| 2018/0290627 A1 | 10/2018 | Hariri et al. | |
| 2018/0337377 A1 | 11/2018 | Stephens et al. | |
| 2018/0345777 A1 | 12/2018 | Bimschein et al. | |
| 2019/0054956 A1* | 2/2019 | Stenvall | B62D 25/08 |
| 2019/0168678 A1 | 6/2019 | Magnuson et al. | |
| 2019/0389444 A1 | 12/2019 | Kistner et al. | |
| 2020/0062183 A1 | 2/2020 | Smith et al. | |
| 2020/0369334 A1 | 11/2020 | Lee | |
| 2021/0171120 A1* | 6/2021 | Kim | B62D 21/11 |
| 2021/0206432 A1* | 7/2021 | Willison | B62D 65/10 |

FOREIGN PATENT DOCUMENTS

| | | |
|---|---|---|
| DE | 102012101483 A1 | 6/2013 |
| DE | 102019109465 A1 | 10/2020 |
| EP | 1538072 A1 | 6/2005 |
| EP | 2552763 A2 | 2/2013 |
| EP | 3174680 A2 | 6/2017 |
| EP | 3689717 A1 | 8/2020 |
| FR | 2698601 A1 | 6/1994 |
| FR | 2990182 A1 | 11/2013 |
| WO | 2016016662 A2 | 2/2016 |
| WO | 2017023726 A1 | 2/2017 |

OTHER PUBLICATIONS

Written Opinion of the International Searching Authority; International Searching Authority; International Patent Application No. PCT/US2021/012327; dated Mar. 9, 2021; 8 pages.

International Search Report; International Searching Authority; International Patent Application No. PCT/US2021/012330; dated Mar. 9, 2021; 2 pages.

Written Opinion of the International Searching Authority; International Searching Authority; International Patent Application No. PCT/US2021/012330; dated Mar. 9, 2021; 9 pages.

International Search Report; International Searching Authority; International Patent Application No. PCT/US2021/012332; dated Mar. 24, 2021; 2 pages.

Written Opinion of the International Searching Authority; International Searching Authority; International Patent Application No. PCT/US2021/012332; dated Mar. 24, 2021; 7 pages.

Supplementary European Search Report; European Patent Office; European Application No. 21710384.5; dated Oct. 21, 2021; 12 pages.

International Search Report; International Searching Authority; International Patent Application No. PCT/US2022/014847; dated Mar. 8, 2022; 3 pages.

Written Opinion of the International Searching Authority; International Searching Authority; International Patent Application No. PCT/US2022/014847; dated Mar. 8, 2022; 6 pages.

International Search Report; International Searching Authority; International Patent Application No. PCT/US2022/014844; dated Mar. 16, 2022; 2 pages.

Written Opinion of the International Searching Authority; International Searching Authority; International Patent Application No. PCT/US2022/014844; dated Mar. 16, 2022; 7 pages.

International Search Report; International Searching Authority; International Patent Application No. PCT/US2022/014852; dated Apr. 18, 2022; 2 pages.

Written Opinion of the International Searching Authority; International Searching Authority; International Patent Application No. PCT/US2022/014852; dated Apr. 18, 2022; 7 pages.

International Search Report; International Searching Authority; International Patent Application No. PCT/US2022/014851; dated Apr. 25, 2022; 2 pages.

Written Opinion of the International Searching Authority; International Searching Authority; International Patent Application No. PCT/US2022/014851; dated Apr. 25, 2022; 7 pages.

Extended European Search Report; European Patent Office; European Application No. 22153650.1; dated Aug. 3, 2022; 9 pages.

(56) References Cited

OTHER PUBLICATIONS

Partial European Search Report (R. 64 EPC); European Patent Office; European Patent Application No. 22153665.9; dated Aug. 18, 2022; 16 pages.
Canadian Office Action; Canadian Intellectual Property Office; Canadian Application No. 3,144,156; dated Feb. 20, 2023; 4 pages.

* cited by examiner

LAND VEHICLES INCORPORATING IMPACT MANAGEMENT SYSTEMS

CROSS-REFERENCE TO RELATED APPLICATION(S)

This application is a continuation application of, and claims priority to, U.S. application Ser. No. 18/106,195, which was filed on Feb. 6, 2023, and which is a continuation of U.S. application Ser. No. 17/884,526, which was filed on Aug. 9, 2022 and is now issued U.S. Pat. No. 11,572,102, and which is a continuation application of U.S. application Ser. No. 17/546,641, which was filed on Dec. 9, 2021 and is now issued U.S. Pat. No. 11,440,590. The contents of those applications are incorporated herein by reference in their entireties.

TECHNICAL FIELD

The present disclosure generally relates to land vehicles incorporating crash safety features, and, more particularly, to utility and delivery vehicles incorporating crash safety features.

BACKGROUND

Crash safety features for land vehicles, particularly crash features incorporated into, or designed for use with, land vehicles such as utility and delivery vehicles, for example, may have various shortcomings. In particular, crash safety features for electric utility and delivery vehicles may have certain drawbacks. For those reasons, among others, crash safety features that avoid the limitations of conventional components and/or systems remain an area of interest.

SUMMARY

The present disclosure may comprise one or more of the following features and combinations thereof.

According to one aspect of the present disclosure, a land vehicle may include a frame structure, a plurality of wheels, and an impact management system. The frame structure may include an operator cage that at least partially defines an operator cabin and a rear compartment positioned rearward of the operator cage in a longitudinal direction. The frame structure may include a pair of rails that each extends in the longitudinal direction from a first end arranged adjacent a pair of front wheels to a second end arranged adjacent a pair of rear wheels. The plurality of wheels may be supported by the frame structure and include the pair of front wheels and the pair of rear wheels. The pair of front wheels may be positioned forward of the pair of rear wheels in the longitudinal direction. The impact management system may be supported by the frame structure and positioned forward of the operator cage in the longitudinal direction. The impact management system may be configured to deform in response to impact forces applied thereto in use of the land vehicle to maintain structural integrity of the operator cage and the pair of rails. The impact management system may include a crash cage extending in the longitudinal direction from the first ends of the pair of rails to a forward-most point of the land vehicle.

In some embodiments, the crash cage may include (i) a pair of upright inner posts each directly affixed to a corresponding one of the first ends of the pair of rails, (ii) a pair of upright outer posts each spaced from a corresponding one of the pair of upright inner posts in a lateral direction perpendicular to the longitudinal direction such that the pair of upright outer posts are located outwardly of the pair of upright inner posts in the lateral direction, (iii) a pair of upper links each extending in the lateral direction from one of the pair of upright inner posts to one of the pair of upright outer posts, and (iv) a base link extending in the lateral direction from one of the pair of upright outer posts to the other of the pair of upright outer posts that is positioned vertically beneath the pair of upper links relative to a support surface on which the land vehicle is positioned. One of the pair of upright outer posts, one of the pair of upright inner posts, one of the pair of upper links, and the base link may cooperate to at least partially define a first four-bar linkage of the crash cage, and the other of the pair of upright outer posts, the other of the pair of upright inner posts, the other of the pair of upper links, and the base link may cooperate to at least partially define a second four-bar linkage of the crash cage. The first four-bar linkage and the second four-bar linkage may be aligned with the pair of rails in the longitudinal direction at the first ends of the pair of rails.

In some embodiments, the crash cage may include a lower crash assembly having a first lower beam extending parallel to the pair of rails in the longitudinal direction, a second lower beam spaced from the first lower beam in the lateral direction and extending parallel to the pair of rails in the longitudinal direction, a first crossbar extending in the lateral direction to interconnect the first and second lower beams, and a second crossbar positioned rearward of the first crossbar in the longitudinal direction that extends in the lateral direction to interconnect the first and second lower beams. The first lower beam may extend in the longitudinal direction from one end coupled to one of the pair of upright inner posts to another end arranged adjacent the forward-most point of the land vehicle, the second lower beam may extend in the longitudinal direction from one end coupled to the other of the pair of upright inner posts to another end arranged adjacent the forward-most point of the land vehicle, the lower crash assembly may include a first strut affixed to the first lower beam and the second crossbar such that the first strut is arranged oblique to the first lower beam, and the lower crash assembly may include a second strut affixed to the second lower beam and the second crossbar such that the second strut is arranged oblique to the second lower beam.

In some embodiments, the crash cage may include an upper crash assembly having (i) a first upper beam extending parallel to the pair of rails in the longitudinal direction that is coupled to one of the pair of upright inner posts such that the first upper beam is arranged vertically above the pair of rails, (ii) a second upper beam spaced from the first upper beam in the lateral direction that extends parallel to the pair of rails in the longitudinal direction and is coupled to the other of the pair of upright inner posts such that the second upper beam is arranged vertically above the pair of rails, and (iii) a crash wall interconnecting the first and second upper beams in the lateral direction that is arranged adjacent the forward-most point of the land vehicle. The crash cage may include a first outrigger structure extending from one of the pair of upright outer posts to a first end of the crash wall located adjacent the first upper beam and a second outrigger structure extending from the other of the pair of upright outer posts to a second end of the crash wall located adjacent the second upper beam. The first outrigger structure may be shaped to define a first arc between the one of the pair of upright outer posts and the first end of the crash wall, the second outrigger structure may be shaped to define a second arc between the other of the pair of upright outer posts and the second end of the crash wall, and the first and second outrigger structures may be configured for deformation in response to forces applied thereto in one or more directions that are not parallel to the longitudinal direction. The crash cage may include a first reinforcement brace extending outwardly in the lateral direction and upwardly in a vertical direction from the first upper beam to the first outrigger structure and a second reinforcement brace extending outwardly in the lateral direction and upwardly in the vertical direction from the second upper beam to the second outrigger structure.

According to another aspect of the present disclosure, a land vehicle may include a frame structure, a plurality of wheels, and an impact management system. The frame structure may include an operator cage that at least partially defines an operator cabin and a rear compartment positioned rearward of the operator cage in a longitudinal direction. The frame structure may include a pair of rails that each extends in the longitudinal direction. The operator cabin may include a steering wheel, an operator seat, and a rack arranged in the operator cabin opposite the steering wheel and the operator seat that includes a plurality of trays. The plurality of wheels may be supported by the frame structure. The impact management system may be supported by the frame structure and positioned forward of the operator cage in the longitudinal direction. The impact management system may be configured to deform in response to impact forces applied thereto in use of the land vehicle to maintain structural integrity of at least some components of the frame structure. The impact management system may include a crash cage extending in the longitudinal direction from the pair of rails to a forward-most point of the land vehicle.

In some embodiments, the operator cabin may include a pair of tracks affixed to a floor of the operator cabin and spaced apart from one another in the longitudinal direction, the rack may be movable along the pair of tracks in a lateral direction perpendicular to the longitudinal direction between a stowed position, in which the rack is disposed distant from the operator seat, and a delivery position, in which the rack is disposed close to the operator seat, and the land vehicle may have a gross vehicular weight rating (GVWR) of between 10,001 pounds and 14,000 pounds. Additionally, in some embodiments, the land vehicle may include a plurality of electric motors to generate rotational power that are supported by the plurality of wheels, and one of the plurality of electric motors may be integrated directly into each one of the plurality of wheels. In some embodiments still, the land vehicle may include a brake system coupled to each one of the plurality of wheels, and each brake system may include (i) a disc having a plurality of notches defined between circumferentially adjacent teeth of the disc, (ii) a first braking device configured to contact an outer face of the disc to resist rotation of one of the plurality of wheels, (iii) a second braking device circumferentially spaced from the first braking device about the disc that is configured to contact the outer face of the disc to resist rotation of the one of the plurality of wheels, and (iv) a third braking device configured to contact one or more teeth of the disc to resist rotation of the one of the plurality of wheels.

In some embodiments, the crash cage may include (i) a pair of upright inner posts each directly affixed to a corresponding one of the pair of rails, (ii) a pair of upright outer posts each spaced from a corresponding one of the pair of upright inner posts in a lateral direction perpendicular to the longitudinal direction such that the pair of upright outer posts are located outwardly of the pair of upright inner posts in the lateral direction, (iii) a pair of upper links each extending in the lateral direction from one of the pair of upright inner posts to one of the pair of upright outer posts, and (iv) a base link extending in the lateral direction from one of the pair of upright outer posts to the other of the pair of upright outer posts that is positioned vertically beneath the pair of upper links relative to a support surface on which the land vehicle is positioned. The crash cage may include (v) a first lower beam extending parallel to the pair of rails in the longitudinal direction, (vi) a second lower beam spaced from the first lower beam in the lateral direction and extending parallel to the pair of rails in the longitudinal direction, (vii) a first crossbar extending in the lateral direction to interconnect the first and second lower beams, (viii) a second crossbar positioned rearward of the first crossbar in the longitudinal direction that extends in the lateral direction to interconnect the first and second lower beams, (ix) a first strut affixed to the first lower beam and the second crossbar such that the first strut is arranged oblique to the first lower beam, and (x) a second strut affixed to the second lower beam and the second crossbar such that the second strut is arranged oblique to the second lower beam. The crash cage may include (xi) a first upper beam extending parallel to the pair of rails in the longitudinal direction that is coupled to one of the pair of upright inner posts such that the first upper beam is arranged vertically above the pair of rails, (xii) a second upper beam spaced from the first upper beam in the lateral direction that extends parallel to the pair of rails in the longitudinal direction and is coupled to the other of the pair of upright inner posts such that the second upper beam is arranged vertically above the pair of rails, and (xiii) a crash wall interconnecting the first and second upper beams in the lateral direction that is arranged adjacent the forward-most point of the land vehicle. The crash cage may include (xiv) a first outrigger structure extending from one of the pair of upright outer posts to a first end of the crash wall located adjacent the first upper beam and (xv) a second outrigger structure extending from the other of the pair of upright outer posts to a second end of the crash wall located adjacent the second upper beam. The crash cage may include (xvi) a first reinforcement brace extending outwardly in the lateral direction and upwardly in a vertical direction from the first upper beam to the first outrigger structure and (xvii) a second reinforcement brace extending outwardly in the lateral direction and upwardly in the vertical direction from the second upper beam to the second outrigger structure.

According to another aspect of the present disclosure, a land vehicle may include a frame structure, a plurality of wheels, and an impact management system. The frame structure may include an operator cage that at least partially defines an operator cabin and a rear compartment positioned rearward of the operator cage in a longitudinal direction. The frame structure may include a pair of rails that each extends in the longitudinal direction. The plurality of wheels may be supported by the frame structure. The impact management system may be supported by the frame structure and positioned forward of the operator cage in the longitudinal direction. The impact management system may be configured to deform in response to impact forces applied thereto in use of the land vehicle to maintain structural integrity of at least some components of the frame structure. The impact management system may include a crash cage having a pair of upright inner posts, a pair of upright outer posts, a pair of upper links, and a base link. Each of the pair of upright inner posts may be directly affixed to a corresponding one of the pair of rails. Each of the pair of upright outer posts may be spaced from a corresponding one of the pair of upright inner posts in a lateral direction perpendicular to the longitudinal direction such that the pair of upright outer posts are located outwardly of the pair of upright inner posts in the lateral direction. Each of the pair of upper links may extend in the lateral direction from one of the pair of upright inner posts to one of the pair of upright outer posts. The base link may extend in the lateral direction from one of the pair of upright outer posts to the other of the pair of upright outer posts and be positioned vertically beneath the pair of upper links relative to a support surface on which the land vehicle is positioned.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF ILLUSTRATIVE EMBODIMENTS

Figure 1:
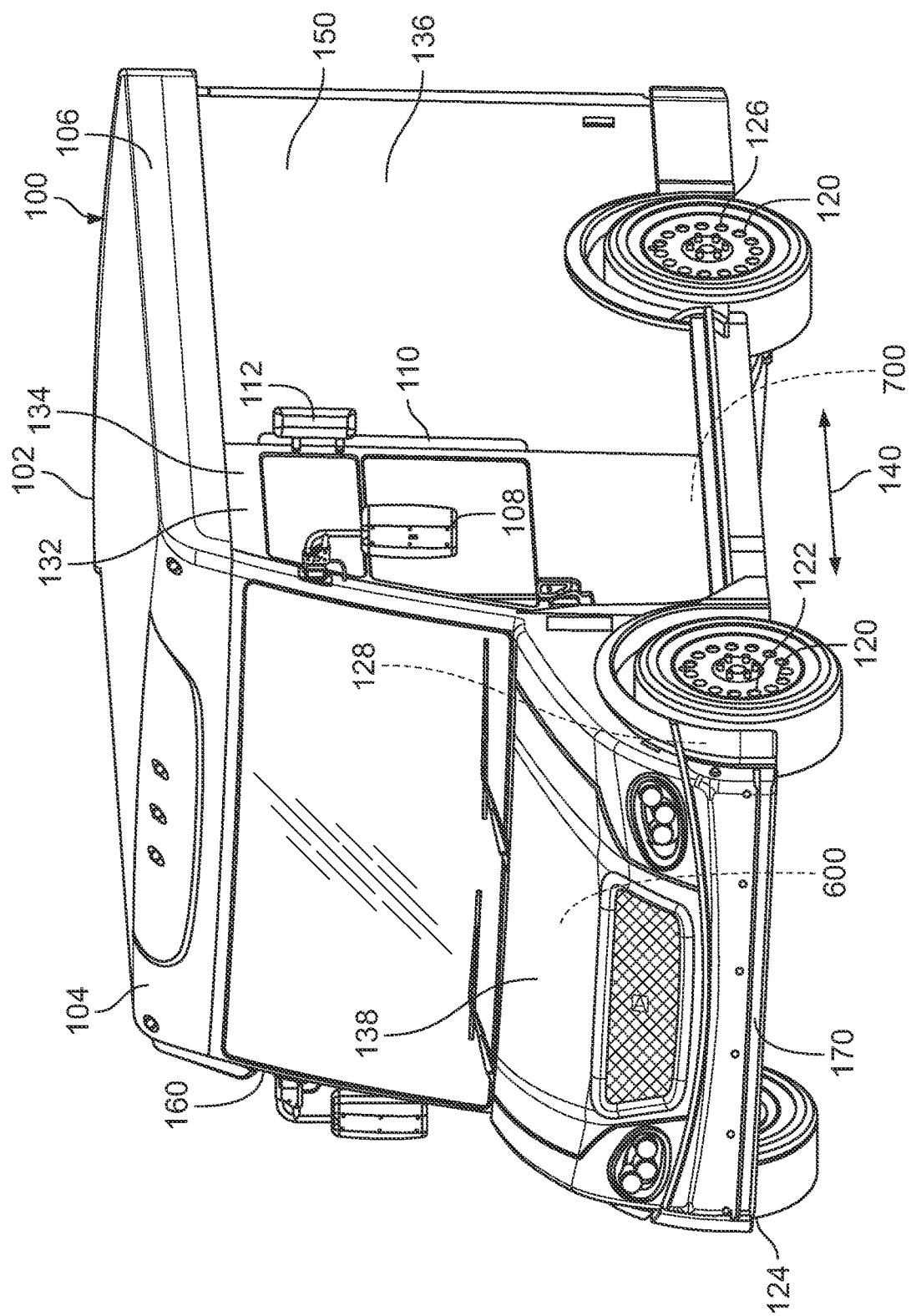
FIG. 1 is a front perspective view of an electric vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative land vehicle 100 is embodied as, or otherwise includes, an electric delivery vehicle 102, such as an electric delivery truck adapted for any use as a delivery vehicle, for example. In some embodiments, the electric delivery vehicle 102 is adapted for use as a mail delivery vehicle that may be employed by the United States Postal Service. Of course, in other embodiments, the electric delivery vehicle 102 may be configured for use in a variety of other suitable applications. Furthermore, in other embodiments, the land vehicle 100 may be embodied as, or otherwise include, an electric utility van.

In some embodiments, the illustrative electric delivery vehicle 102 is a postal delivery truck. Additionally, in some embodiments, the illustrative delivery vehicle 102 is a non-postal delivery truck. In embodiments in which the delivery vehicle 102 is a non-postal delivery truck, the vehicle 102 may be employed in a variety of applications, such as the applications mentioned below, for example.

The illustrative land vehicle 100 may include one or more of the features of the electric vehicle described in co-pending U.S. patent application Ser. No. 17/546,555 such as a roof cap 104, one or more rain gutter(s) 106, one or more blind spot camera system(s) 108, one or more opera window (s) 110, and one or more opera window mirror(s) 112, just to name a few. Additionally, the illustrative land vehicle 100 may include one or more features of the electric vehicle described in co-pending U.S. patent application Ser. No. 17/546,593, such as electric motors 400 (see FIG. 4), for example. Furthermore, the illustrative land vehicle 100 may include one or more features of the electric vehicle described in co-pending U.S. patent application Ser. No. 17/546,500, such as brake systems 500 (see FIG. 5), for example. The disclosures of those applications are incorporated herein by reference in their entireties.

In some embodiments, the illustrative land vehicle 100 may include a monocoque, such as one of the monocoques described in U.S. patent application Ser. No. 17/142,766. Furthermore, in some embodiments, a monocoque of the illustrative land vehicle 100 may be formed using a modular mold system, such as one of the modular mold systems described in U.S. patent application Ser. No. 17/142,766. Further still, in some embodiments, a monocoque of the illustrative land vehicle 100 may be formed according to the methods described in U.S. patent application Ser. No. 17/142,785. The disclosures of those applications are incorporated herein by reference in their entireties.

It should be appreciated that the land vehicle 100 may be employed in a variety of applications. In some embodiments, the land vehicle 100 may be embodied as, or otherwise included in, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, the vehicle 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

The illustrative land vehicle 100 includes a frame structure 700 (see FIG. 7) and wheels 120 supported by the frame structure 700. The frame structure 700 includes, or otherwise at least partially defines, an operator cage 132 that at least partially defines an operator cabin 134 and a rear compartment 136 positioned rearward of the operator cage 132 in a longitudinal direction 140 (i.e., in the lengthwise direction of the vehicle 100). In the illustrative embodiment, the frame structure 700 includes rails 702, 704 extending in the longitudinal direction 140 from respective ends 706, 708 arranged adjacent front wheels 122, 124 of the vehicle 100 to respective ends 710, 712 arranged adjacent rear wheels 126, 128 of the vehicle 100. However, as mentioned above, in other embodiments, the land vehicle 100 may include a monocoque. In one example, the monocoque may be provided in place of the frame structure 700. In another example, the monocoque may be provided in addition to the frame structure 700. In yet another example, the frame structure 700 may serve as an reinforcement structure which is disposed internally in the monocoque, and the monocoque may be disposed externally to the frame structure 700.

The illustrative wheels 120 include the front wheels 122, 124 and the rear wheels 126, 128. The front wheel 122 and the rear wheel 126 are illustratively arranged on a left side 150 of the vehicle 100 (i.e., when the vehicle 100 is viewed from the rear) and the front wheel 124 and the rear wheel 128 are illustratively arranged on a right side 160 of the vehicle 100 disposed opposite the left side 150. In the illustrative embodiment, the front wheels 122, 124 are positioned forward of the rear wheels 126, 128 in the longitudinal direction 140.

Figure 6:
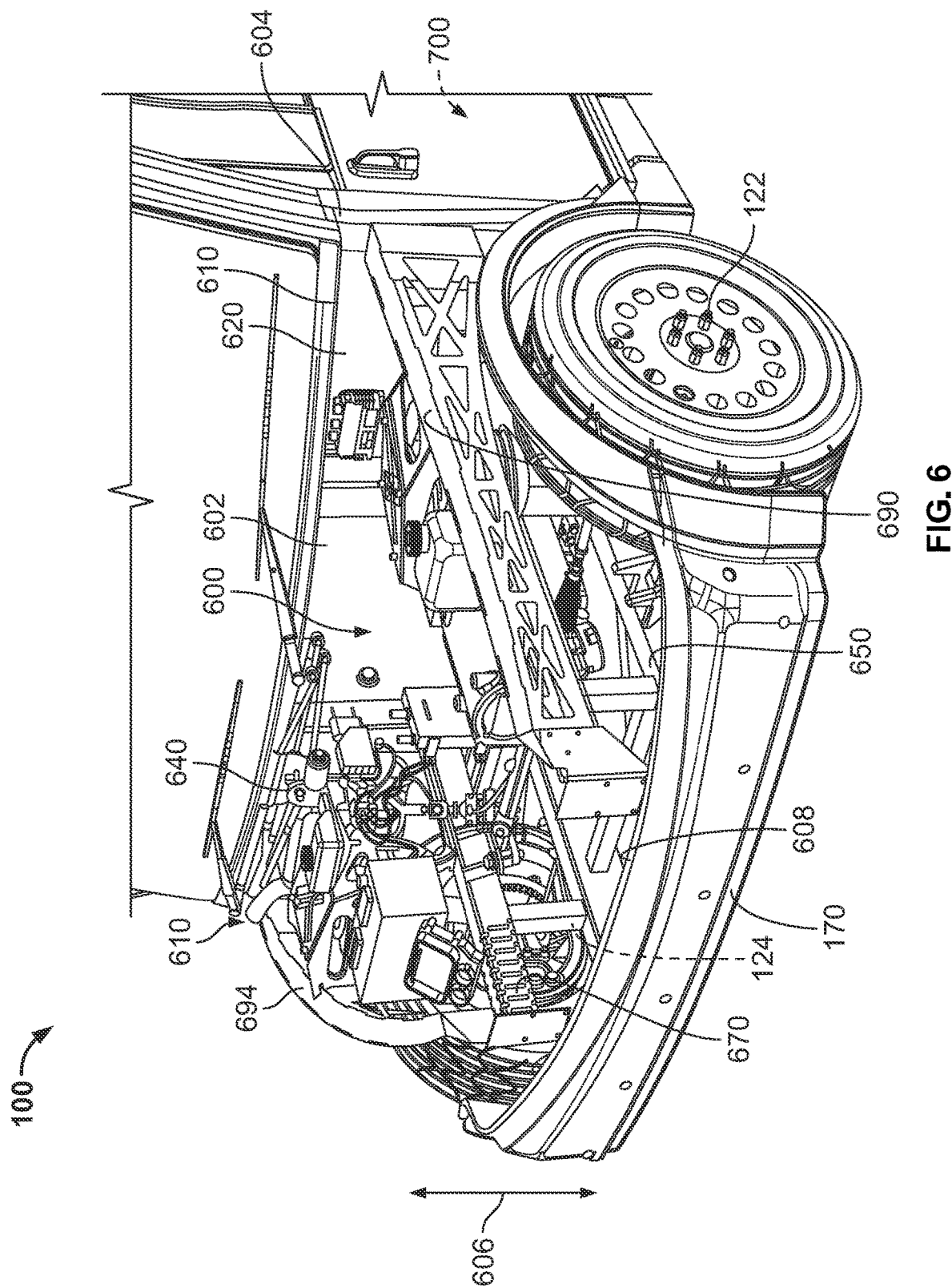
FIG. 6 is a front perspective view of the electric vehicle of FIG. 1 showing an impact management system of the vehicle.

In the illustrative embodiment, the land vehicle 100 includes an impact management system 600 (see FIG. 6) supported by the frame structure 700 and positioned forward of the operator cage 132 in the longitudinal direction 140. The impact management system 600 may be concealed by a hood 138 of the vehicle 100 as shown in FIG. 1. The illustrative impact management system 600 is configured to deform in response to impact forces applied thereto in use of the vehicle 100 to maintain structural integrity of the operator cage 132 and the rails 702, 704. Additionally, in some embodiments, deformation of the impact management system 600 resulting from an impact or a crash may maintain structural integrity of other components of the vehicle 100. In any case, as described in greater detail below with reference to FIGS. 6 and 7, the illustrative impact management system 600 includes a crash cage 610. As best seen in FIGS. 6 and 8, the crash cage 610 extends in the longitudinal direction 140 from the ends 706, 708 of the rails 702, 704 to a forward-most point 170 of the vehicle 100.

It should be appreciated that the illustrative impact management system 600 is configured to dissipate energy and/or forces applied to the vehicle 100 during an impact event or crash. Of course, energy and/or forces resulting from an impact event may be applied to the vehicle 100 at various locations. In one example, such energy and/or forces may be applied to the vehicle 100 at a location proximate the forward-most point 170 and in a direction generally parallel to the longitudinal direction 140 (e.g., during a head-on collision). In another example, such energy and/or forces may be applied to the vehicle 100 near one or more of the front wheels 122, 124 and in a direction generally perpendicular to the longitudinal direction 140 (e.g., during a side collision). Regardless, as a consequence of the energy dissipation effected by the illustrative impact management system 600, lower magnitude energy and/or forces may be transmitted to other components of the vehicle 100. In some cases, as discussed below with respect to FIGS. 9-11, deformation of the illustrative impact management system 600 is associated with, or otherwise corresponds to, minimal transmission of energy and/or forces resulting from an impact event to the operator cage 132 and the rails 702, 704 such that those components remain substantially intact during the impact event.

Figure 2:
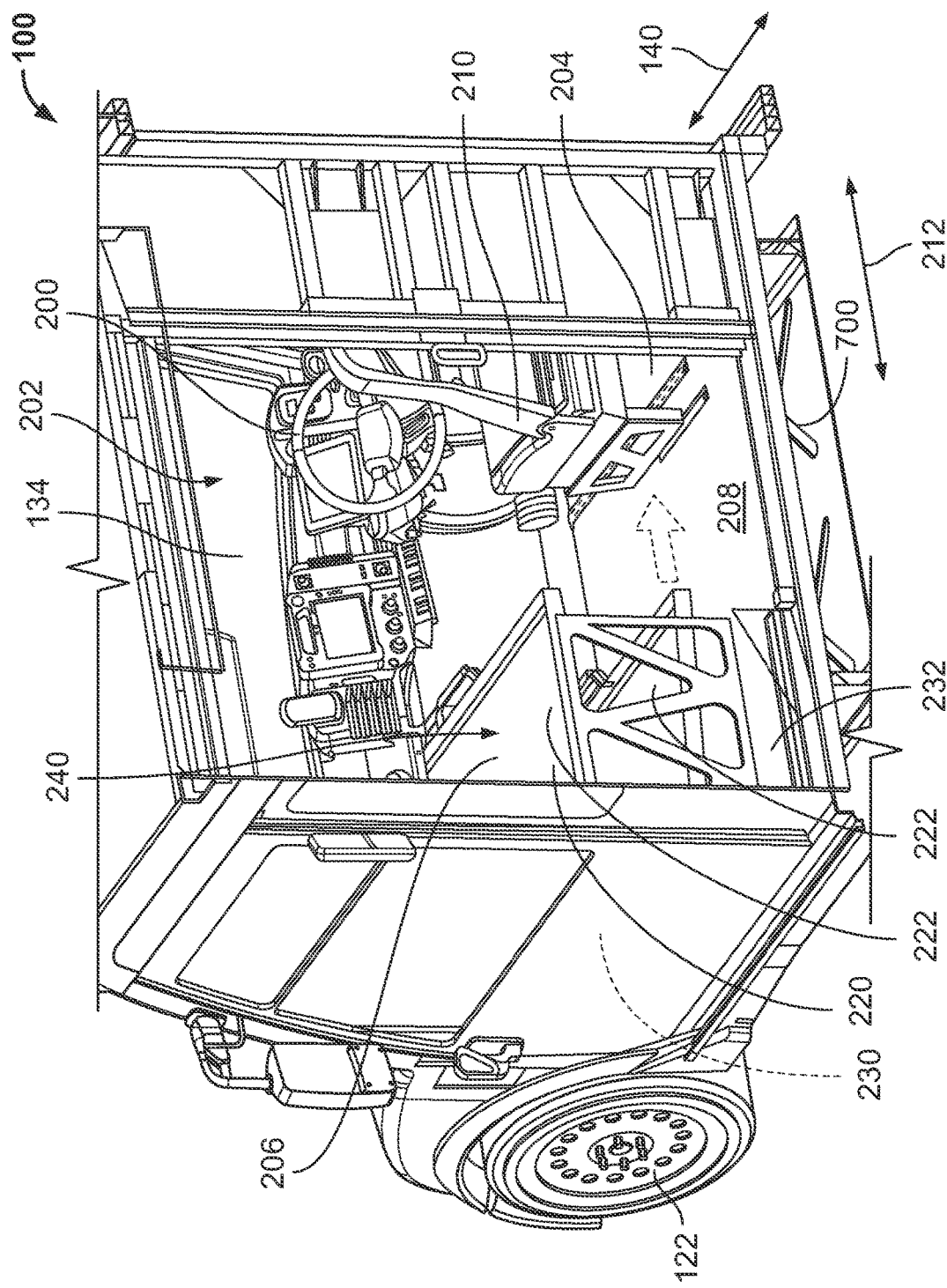
FIG. 2 is a sectional view of the electric vehicle of FIG. 1 taken about line 2-2 showing a rack in a stowed position in which the rack is disposed distant from an operator seat.
Figure 3:
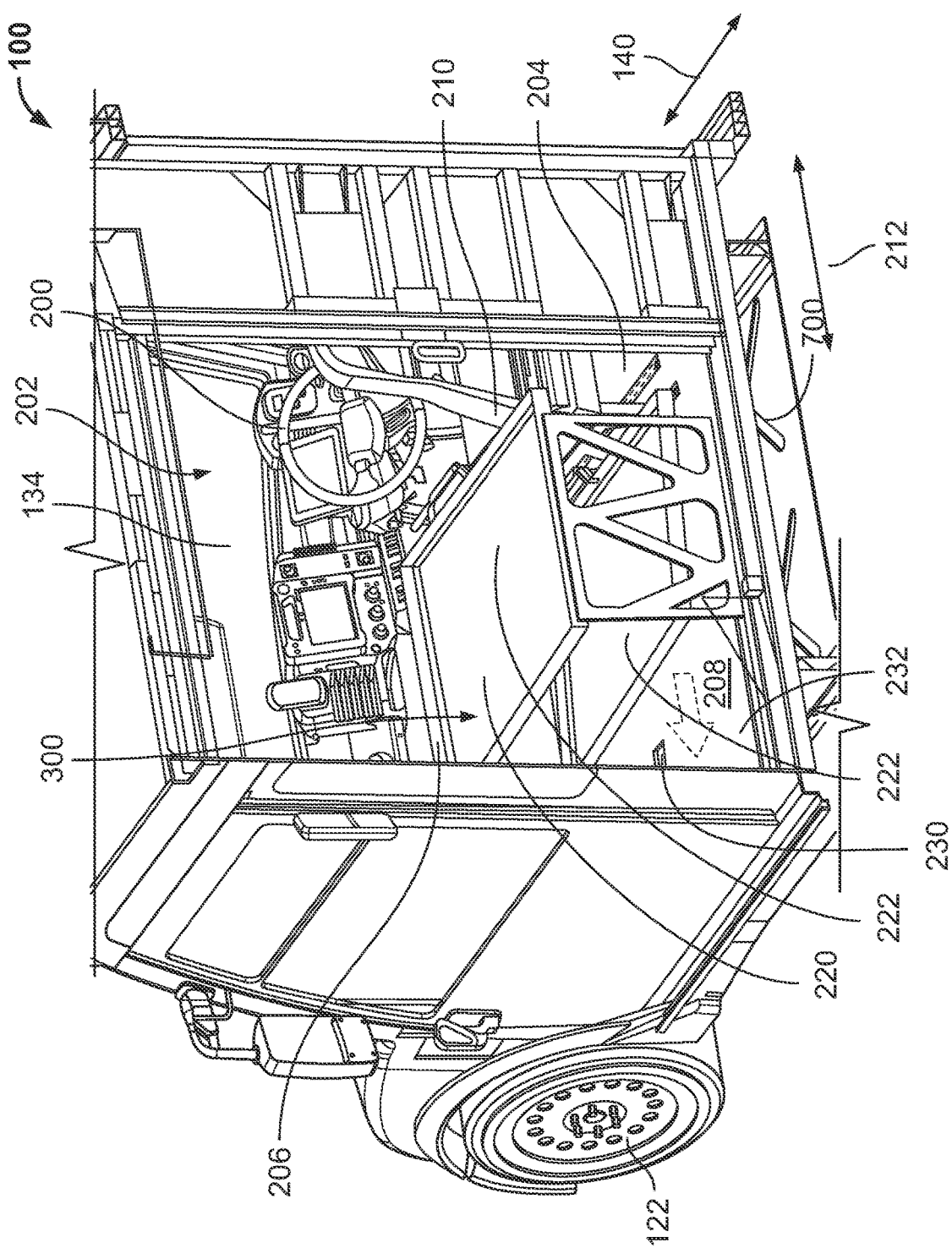
FIG. 3 is a sectional view similar to FIG. 2 showing the rack in a delivery position in which the rack is disposed close to the operator seat.

Referring now to FIGS. 2 and 3, in the illustrative embodiment, a number of features are included in the operator cabin 134 of the land vehicle 100. Those features are described in greater detail in co-pending U.S. application Ser. No. 17/546,555. Among other things, the illustrative operator cabin 134 includes, or otherwise houses, a steering wheel 200, an operator seat 210, and a rack 220 including trays 222.

The illustrative operator cabin 134 includes a right-hand drive configuration 202 in which the steering wheel 200 and the operator seat 210 are arranged on a right side 204 of the cabin 134. It should be appreciated that the configuration 202 may facilitate curbside delivery from a driver seated in the operator seat 210 to a curbside mailbox, at least in some embodiments. In any case, in the illustrative right-hand configuration 202 of the operator cabin 134, the rack 220 is mounted on a left side 206 of the cabin 134 opposite the steering wheel 200 and the operator seat 210. As such, the rack 220 occupies a space that might otherwise be occupied by a passenger or driver seat in other configurations.

The illustrative operator cabin 134 includes, or otherwise houses, a pair of tracks 230, 232 that are affixed to a floor 208 of the cabin 134. The tracks 230, 232 are spaced apart from one another in the longitudinal direction 140 and arranged on the left side 206 of the cabin 134. In the illustrative embodiment, the rack 220 is movable in the operator cabin 134 along the tracks 230, 232 in a lateral direction 212 perpendicular to the longitudinal direction 140.

In the illustrative embodiment, the rack 220 is movable in the operator cabin 134 along the tracks 230, 232 in the lateral direction 212 between a stowed position 240 and a delivery position 300. In the stowed position 240 of the rack 220, the rack 220 is disposed distant from the operator seat 210. It should be appreciated that when the rack 220 is disposed in the stowed position 240, items (e.g., mail parcels, articles, etc.) held by the trays 222 of the rack 220 may be located sufficiently far from the operator such that the operator may be required to leave the seat 210 to access the items. In the delivery position 300 of the rack 220, the rack 220 is disposed close to the operator seat 210. As a result, when the rack 220 is disposed in the delivery position 300, items held by the trays 222 of the rack 220 may be accessed by the operator without leaving the seat 210, at least in some embodiments.

It should be appreciated that in the United States, trucks are often classified according to their gross vehicular weight rating (GVWR) which may correspond to particular truck classifications and duty classifications given in Table 1 below. In some embodiments, the vehicle 100 has a GVWR (i.e., accounting for the weight of the truck when empty and the payload carrying capacity of the truck when full) of between 6,000 pounds and 19,800 pounds. Additionally, in some embodiments, the vehicle 100 has a GVWR of between 10,001 pounds and 14,000 pounds such that the vehicle 100 is embodied as, or otherwise includes, a Class 3 electric delivery truck. In one particular example, in some embodiments, the vehicle 100 has a 1000 cubic foot capacity and weighs roughly 6,500 pounds when empty and has a 6,000 pound payload capacity such that the vehicle 100 has a GVWR of about 12,500 pounds. Of course, it should be appreciated that in other embodiments, the vehicle 100 may be embodied as, or otherwise include, a Class 3 vehicle, a Class 4 vehicle, or a Class 5 vehicle.

TABLE 1

| US Truck Class | Duty Classification | Weight Limit |
| --- | --- | --- |
| Class 1 | Light Truck | 0-6,000 Pounds |
| Class 2a | Light Truck | 6,001-8,500 Pounds |
| Class 2b | Light/Medium Truck | 8,501-10,000 Pounds |
| Class 3 | Medium Truck | 10,001-14,000 Pounds |
| Class 4 | Medium Truck | 14,001-16,000 Pounds |
| Class 5 | Medium Truck | 16,001-19,500 Pounds |
| Class 6 | Medium Truck | 19,501-26,000 Pounds |
| Class 7 | Heavy Truck | 26,001-33,000 Pounds |
| Class 8 | Heavy Truck | 33,001 Pounds+ |

It should be appreciated that in some embodiments, the illustrative cabin 134 may include a left-hand drive configuration in which the steering wheel 200 and the operator seat 210 are arranged on the left side 206 of the cabin 134. In such a left-hand drive configuration, the rack 220 may be mounted on the right side 204 of the cabin 134 opposite the steering wheel 200 and the operator seat 210. As such, the rack 220 may occupy a space that might otherwise be occupied by a passenger or driver seat in other configurations. Furthermore, in such a left-hand drive configuration, the tracks 230, 232 may be arranged on the right side 204 of the cabin 134.

In some embodiments, the vehicle 100 is embodied as, or otherwise includes, any one of a Class 3 through Class 5 electric delivery truck having a right-hand drive configuration. Additionally, in some embodiments, the vehicle 100 is embodied as, or otherwise includes, any one of a Class 3 through Class 5 electric delivery truck having a left-hand drive configuration. Further, in some embodiments still, the vehicle 100 is embodied as, or otherwise includes, any one of a Class 3 through Class 5 electric delivery truck having another suitable drive configuration, such as a configuration in which the steering wheel 200 and the operator seat 210 are centrally located in the cabin 134 in the lateral direction 212, for example.

Figure 4:
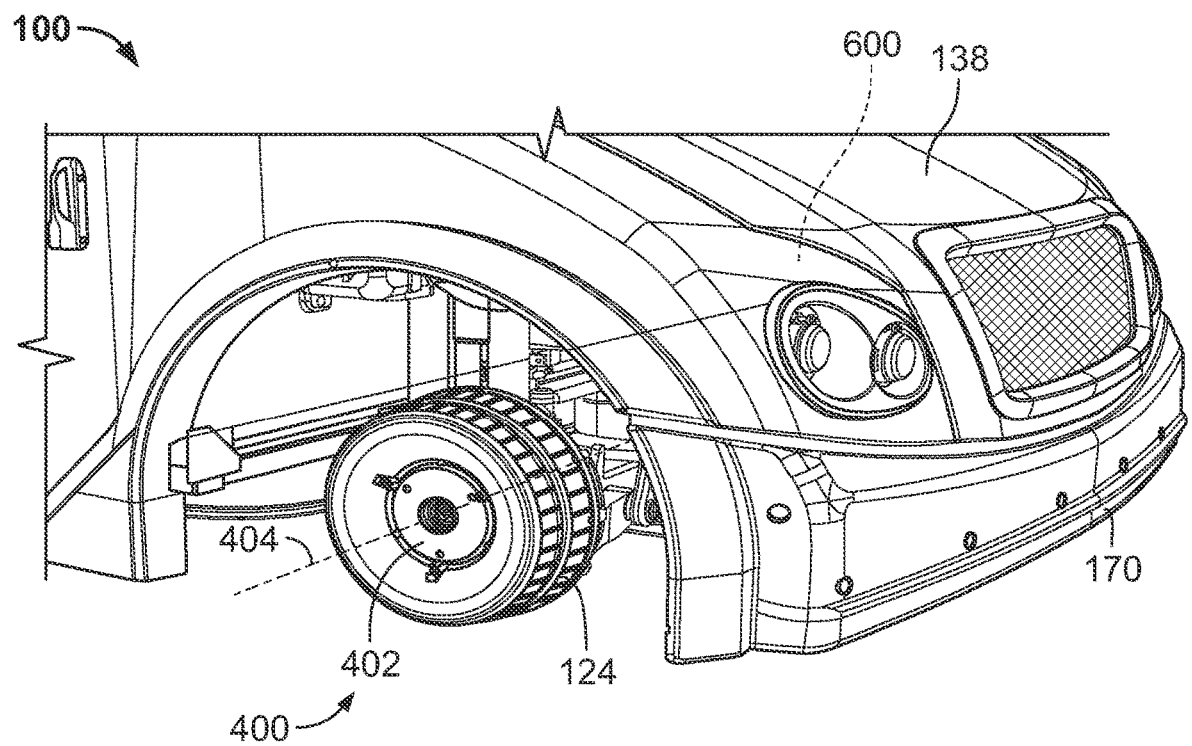
FIG. 4 is a perspective view of the electric vehicle of FIG. 1 showing an electric motor integrated directly into a wheel.

Referring now to FIG. 4, in the illustrative embodiment, the land vehicle 100 includes electric motors 400 configured to produce rotational power to drive rotation of the wheels 120 in use of the vehicle 100. Each of the electric motors 400 is directly integrated into one of the wheels 120 such that the vehicle 100 includes four electric motors 400. As shown in FIG. 4, one of the electric motors 400 (i.e., the electric motor 402) is directly integrated into the wheel 124.

The illustrative motor 402 is embodied as, or otherwise includes, any device that is capable of being driven by electrical energy supplied by a power cell assembly 810 (see FIG. 8) to produce rotational power. As indicated above, the illustrative motor 402 is directly integrated into the wheel 124 so that rotational power produced by the motor 402 is provided directly to the wheel 124 in use of the vehicle 100. At least in some embodiments, the motor 402 is directly integrated into the wheel 124 such that the motor 402 and the wheel 124 are concentrically mounted about an axis 404. In such embodiments, the axis 404 may define, or otherwise coincide with, a rotational axis of the wheel 124.

In some embodiments, each of the electric motors 400 is configured to generate about 100 horsepower (hp) in use of the land vehicle 100. In some embodiments, each of the motors 400 may be embodied as, or otherwise include, a brushed DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. Of course, it should be appreciated that in other embodiments, each of the motors 400 may be embodied as, or otherwise include, another suitable device capable of converting electrical energy supplied by the power cell assembly 810 to rotational power to drive the wheels 120. In some embodiments, each of the electric motors 400 is configured to generate a sufficient amount of rotational power and/or motive force to drive movement of one or more of the wheels 120 over an estimated service life of the vehicle 100, which may encompass a significant number of missions and/or delivery trips. In such embodiments, each of the motors 400 may be configured to generate less than 100 horsepower in use of the vehicle 100 or greater than 100 horsepower in use of the vehicle 100, whatever the case may be.

In the illustrative embodiment, each of the electric motors 400 is coupled to one of the wheels 120 without any transmission gearing interposed therebetween. Even more, at least in some embodiments, the illustrative land vehicle 100 entirely omits one or more transmissions. Consequently, in such embodiments, the land vehicle 100 is free from components that may be present in conventional transmissions, such as torque converters, rotating torque-transmitting mechanisms or clutches, stationary torque-transmitting mechanisms or brakes, transmission gearing, pressure control valves, shift control valves, regulator valves, check valves, and various components of electro-hydraulic control systems. As a result, the powertrain and/or drivetrain of the vehicle 100 may include significantly fewer parts than other configurations, thereby facilitating maintenance, reliability, and reduced design complexity, among other things.

In the illustrative embodiment, the electric motors 400 of the land vehicle 100 are the only components of the vehicle 100 capable of generating rotational power to drive the wheels 120. The illustrative land vehicle 100 therefore does not include an internal combustion engine. As such, the land vehicle 100 is free from a number of components that may be utilized in conventional configurations to transmit rotational power from one or more internal combustion engines to one or more wheels, such as driveshafts, differentials, and axles, just to name a few. In that additional respect, the powertrain and/or drivetrain of the vehicle 100 may include significantly fewer parts than other configurations, which may facilitate maintenance, reliability, and reduced design complexity as mentioned above.

Figure 5:
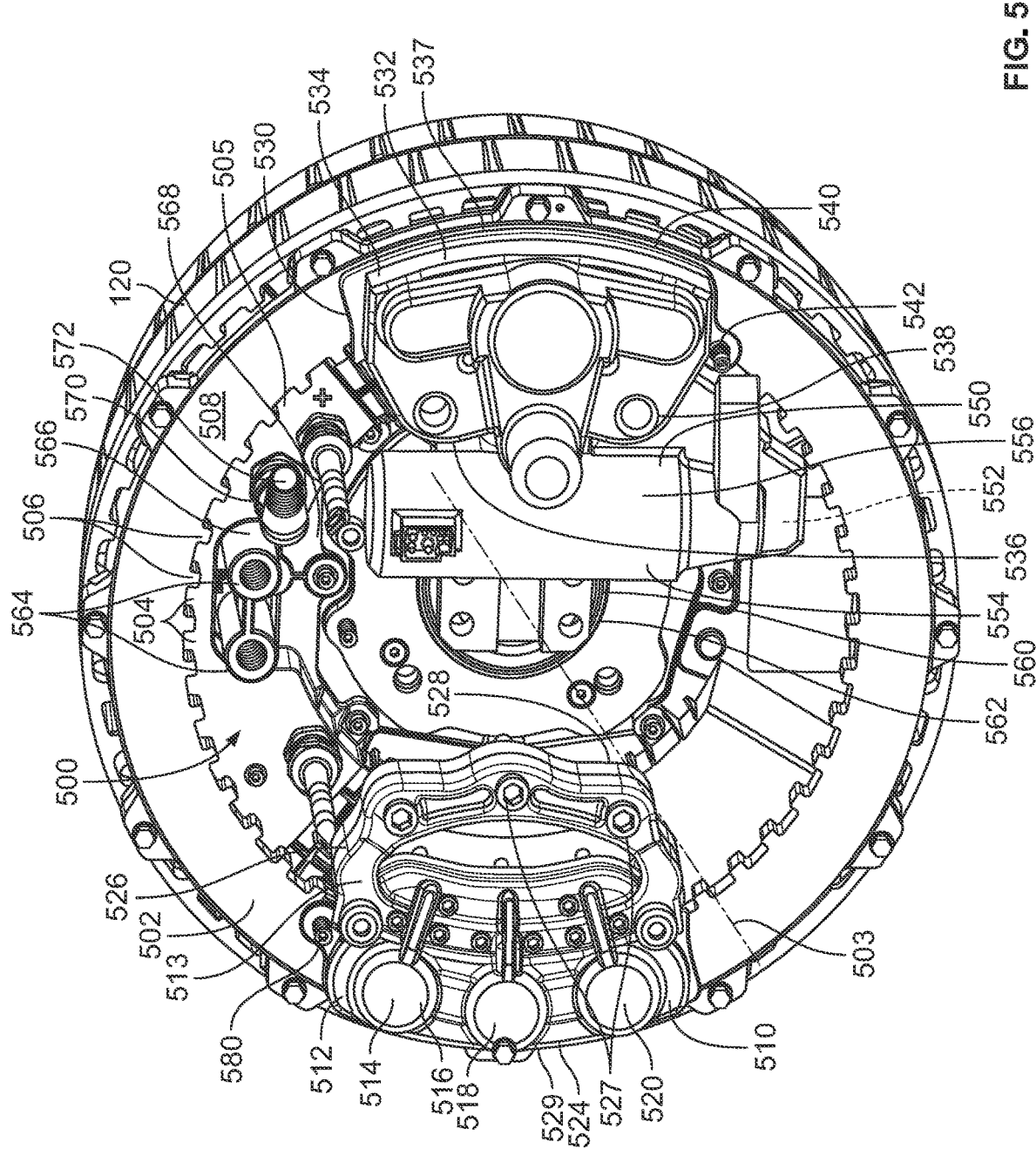
FIG. 5 is a perspective view of a brake system coupled to a wheel of the electric vehicle of FIG. 1.

Referring now to FIG. 5, in the illustrative embodiment, the land vehicle 100 includes brake systems 500 configured to resist rotation of the wheels 120 to stop and/or slow the vehicle 100 in use thereof. One brake system 500 is illustratively coupled to each one of the wheels 120. Each illustrative brake system 500 includes a disc 502, a braking device 510, a braking device 530, and a braking device 550. The illustrative disc 502 includes notches 504 defined between circumferentially adjacent teeth 506 of the disc 502. The illustrative braking device 510 is configured to contact an outer face 508 of the disc 502 to resist rotation of one of the wheels 120 in use of the vehicle 100. The illustrative braking device 530 is circumferentially spaced from the braking device 510 about the disc 502 and configured to contact the outer face 508 thereof to resist rotation of one of the wheels 120 in use of the vehicle 100. The illustrative braking device 550 is configured to contact one or more teeth 506 of the disc 502 to resist rotation of one of the wheels 120 in use of the vehicle 100. It should be appreciated that any one of the braking devices 510, 530, 550 of each brake system 500 may be activated to resist rotation of one of the wheels 120 in use of the vehicle 100 and thereby provide redundant braking means. Additionally, it should be appreciated that the multiple braking devices 510, 530, 550 may be activated in combination with one another to cooperatively resist rotation of one of the wheels 120 in use of the vehicle 100.

In the illustrative embodiment, the disc or rotor 502 of each brake system 500 is configured for rotation about a rotational axis 503. The illustrative disc 502 is coupled to the wheel 120 for common rotation therewith about the axis 503, at least in some embodiments. Additionally, in some embodiments, the disc 502 may be integrally formed with the wheel 120. At an inner diameter 505 thereof, the disc 502 is formed to include the notches 504 that are defined between circumferentially adjacent teeth 506 of the disc 502.

The illustrative braking device 510 is configured to contact the outer face 508 of the disc 502 to resist rotation of the wheel 120 about the axis 503 in use of the land vehicle 100. In the illustrative embodiment, the braking device 510 is embodied as, or otherwise includes, a disc brake assembly. The braking device 510 includes a caliper 512, one or more pistons 514, and brake pads 524. In addition, the braking device 510 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The illustrative caliper 512 of the braking device 510 is embodied as, or otherwise includes, a housing 513 of the braking device 510 that at least partially houses a number of components of the braking device 510, such as the piston(s) 514, for example. In the illustrative embodiment, the braking device 510 includes only one caliper 512. Furthermore, in the illustrative embodiment, the braking device 510 includes six pistons (only pistons 516, 518, 520 are shown in FIG. 5) that are at least partially housed by the only one caliper 512. However, in other embodiments, it should be appreciated that the braking device 510 may include only one piston. The illustrative braking device 510 also includes a pair of brake pads (only brake pad 524 is shown) that are configured to contact opposite sides (i.e., outer and inner sides) of the disc 502 to resist rotation of the wheel 120 about the axis 503 in use of the vehicle 100.

The caliper 512 of the braking device 510 may have a variety of constructions. In the illustrative example, the caliper 512 has a two-piece construction in which two parts (only part 526 is shown in FIG. 5) are secured to one another in close proximity to an end 528 of the caliper 512 by fasteners 527. In the illustrative example, the parts of the caliper 512 are spaced apart from one another in close proximity to an end 529 that is arranged opposite the end 528. The brake pads are coupled to inner sides of the parts and arranged in confronting relation with one another to permit contact between the brake pads and the disc 502 when the disc 502 is positioned between the pads adjacent the end 529. In the illustrative example, a sensor 580 is coupled to the part 526 of the caliper 512 at an outer periphery thereof. The sensor 580 is configured to provide a signal indicative of wear or degradation of the brake pads in use of the vehicle 100, at least in some embodiments. In other examples, however, the caliper 512 may have another suitable construction and be formed from another suitable number of parts.

In some embodiments, the wheel 120 illustratively depicted in FIG. 5 is supported for rotation about the rotational axis 503 by a bearing 560. In such embodiments, a braking sensor 562 is integrated into the bearing 560. The illustrative braking sensor 562 is configured to provide a signal to a control system (not shown) indicative of a rotational speed of the wheel 120 in use of the vehicle 100, at least in some embodiments. The signal provided by the braking sensor 562 may be utilized to control one or more components of an anti-lock brake system (not shown) included in the vehicle 100.

In some embodiments, fluid connections 564 are located radially between the rotational axis 503 and the inner diameter 505 of the disc 502. The fluid connections 564 may be utilized to circulate cooling fluid delivered from a cooling fluid source (not shown) through the wheel 120 to cool the wheel 120 in use of the vehicle 100, at least in some embodiments. Each of the fluid connections 564 may be embodied as, or otherwise include, a projection 566 that extends outwardly away from an interior 568 of the wheel 120 and parallel to the rotational axis 503 such that the fluid connections 564 are not generally not recessed. In some embodiments, a connector 570 is located in the interior 568 of the wheel 120 adjacent the fluid connections 564. The connector 570 may be configured to interface with a single low voltage cable 572 that is at least partially positioned in the interior 568.

In the illustrative embodiment, the braking device 530 is an electronic parking brake mechanism. Additionally, in the illustrative embodiment, the braking device 550 is a parking pawl mechanism. It should be appreciated that in use of the vehicle 100, the braking devices 530, 550 may be operated by a control system independently of one another and/or in concert with one another.

As mentioned above, the illustrative electronic parking brake mechanism 530 is configured to contact the outer face 508 of the disc 502 to resist rotation of the wheel 120 about the axis 503 in use of the vehicle 100. As best seen in FIG. 5, the parking brake mechanism 530 is circumferentially spaced from the braking device 510 about the disc 502 and the axis 503. More specifically, the parking brake mechanism 530 and the braking device 510 are circumferentially spaced about 180 degrees from one another about the disc 502 and the axis 503. In the illustrative arrangement, among other components, the fluid connections 564 and the connector 570 are circumferentially located between the parking brake mechanism 530 and the braking device 510.

At least in some embodiments, the illustrative parking brake mechanism 530 includes a number of features similar to corresponding features of the braking device 510. In such embodiments, the parking brake mechanism 530 includes a housing 532, one or more actuators or pistons 538 at least partially housed by the housing 532, and brake pads (only brake 540 is shown) supported by the housing 532 that are configured to contact opposite sides (i.e., outer and inner sides) of the disc 502 to resist rotation of the wheel 120 about the axis 503 in use of the vehicle 100. In addition, the parking brake mechanism 530 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The housing 532 of the parking brake mechanism 530 may have a variety of constructions. In the illustrative example, the housing 532 has a two-piece construction in which two parts (only part 534 is shown) are secured to one another in close proximity to an end 536 of the housing 532. In the illustrative example, the parts of the housing 532 are spaced apart from one another in close proximity to an end 537 that is arranged opposite the end 536. The brake pads are coupled to inner sides of the parts and arranged in confronting relation with one another to permit contact between the brake pads and the disc 502 when the disc 502 is positioned between the pads adjacent the end 537. In the illustrative example, a sensor 542 is coupled to the part 534 of the housing 532 at an outer periphery thereof. The sensor 542 is configured to provide a signal indicative of wear or degradation of the brake pads in use of the vehicle 100, at least in some embodiments. In other examples, however, the housing 532 may have another suitable construction and be formed from another suitable number of parts.

As mentioned above, the illustrative parking pawl mechanism 550 is configured to contact one or more teeth 506 of the disc 502 to resist rotation of the wheel 120 in use of the vehicle 100. Unlike some conventional devices, the illustrative parking pawl mechanism 550 is not fitted to, and does not interact with, a transmission of the vehicle 100, since the vehicle 100 omits one or more transmissions as indicated above. Thus, unlike some conventional devices, the illustrative parking pawl mechanism 550 does not lock an output shaft of a transmission to prevent rotation of the wheel 120.

In the illustrative embodiment, the parking pawl mechanism 550 includes a pawl or pin 552 at least partially housed by a housing 556. The pawl 552 may be sized to contact one or more of the teeth 506 in use of the mechanism 550. Additionally, in some embodiments, the parking pawl mechanism 550 may include one or more actuators 554 at least partially housed by the housing 556. The one or more actuators 554 are configured to drive movement (e.g., extension) of the pawl 552 relative to the housing 556 to contact one or more of the teeth 506 and thereby resist rotation of the wheel 120, at least in some embodiments. Additionally, in such embodiments, the one or more actuators 554 are configured to drive movement (i.e., retraction) of the pawl 552 relative to the housing 556 to release the pawl 552 and thereby permit rotation of the wheel 120.

Figure 7:
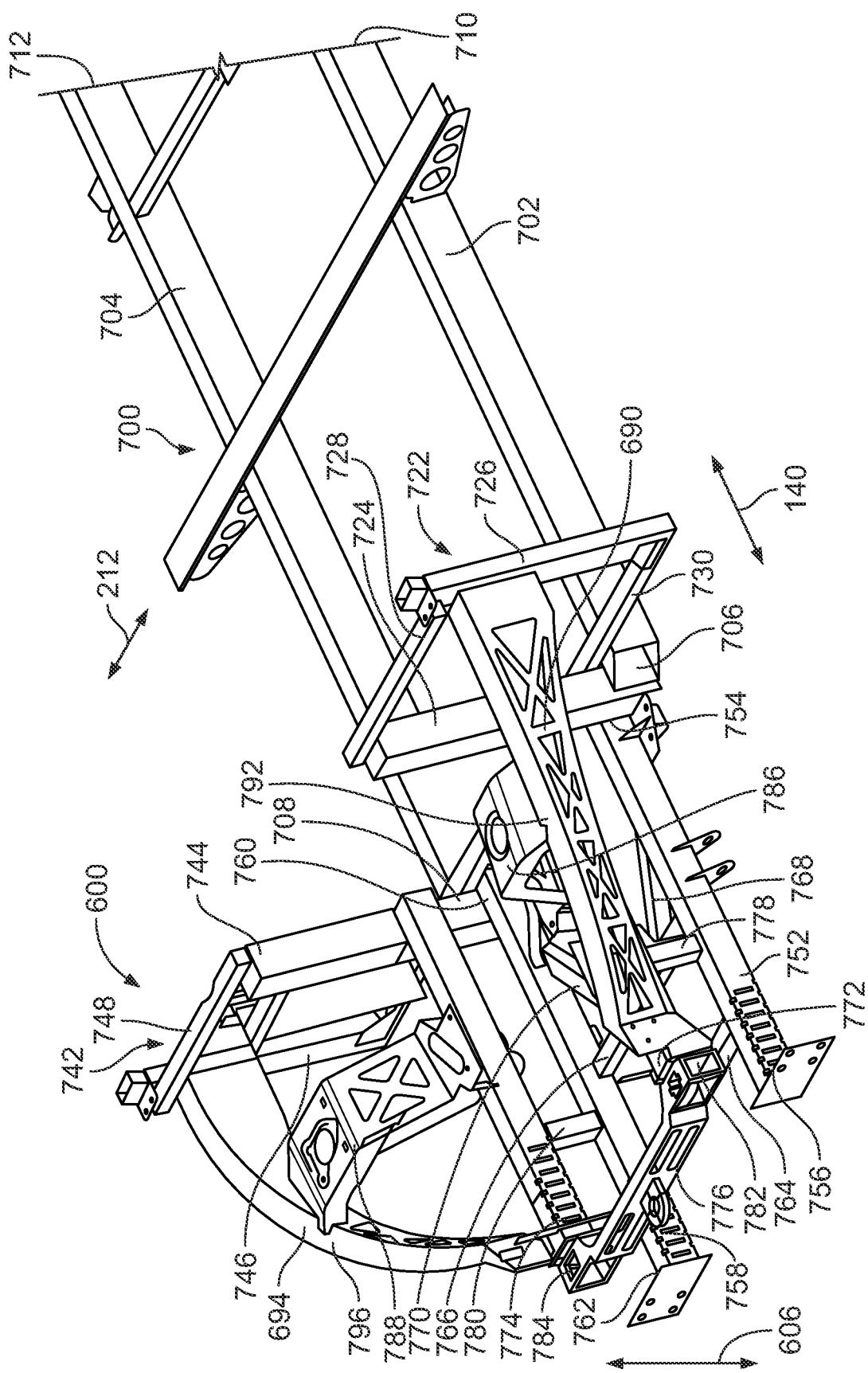
FIG. 7 is a front perspective view of the impact management system depicted in FIG. 6 coupled to a frame structure of the electric vehicle.
Figure 8:
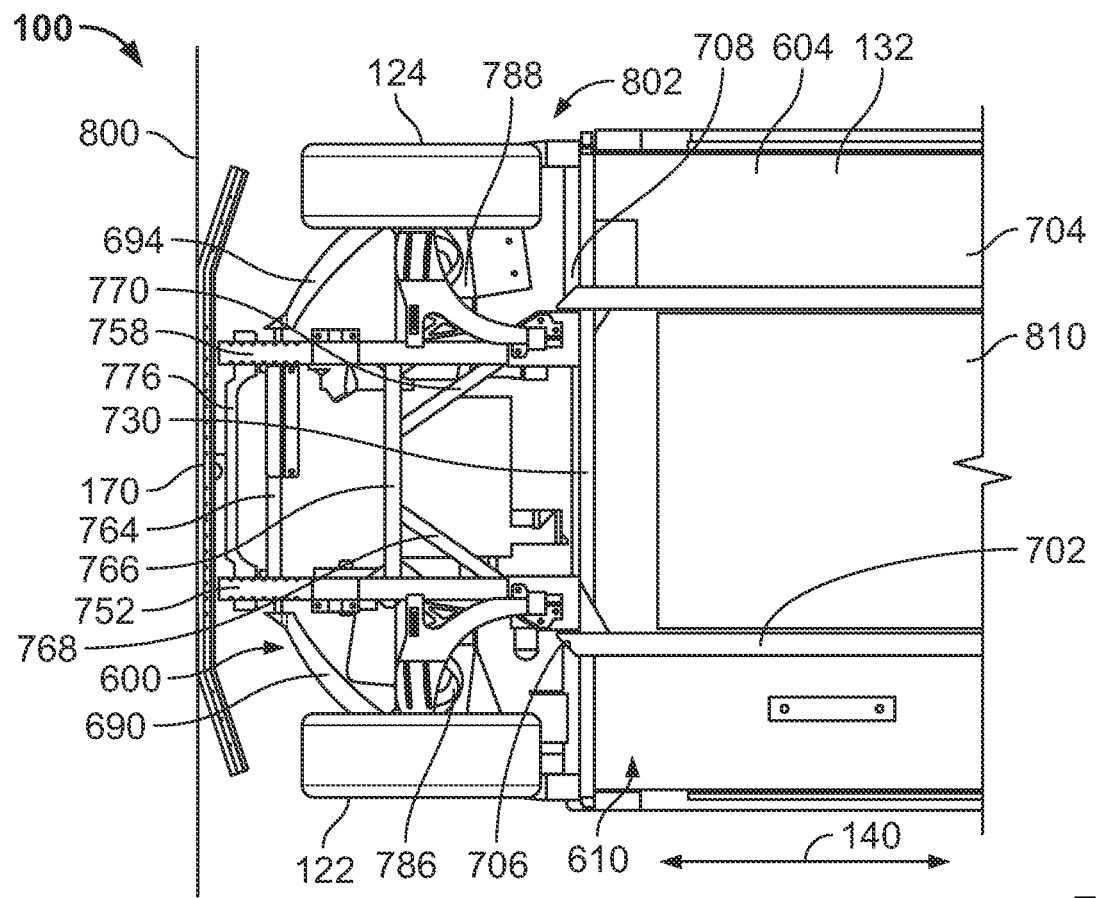
FIG. 8 is a bottom perspective view of the electric vehicle of FIG. 1 prior to impact between the vehicle and a stationary structure.

Referring now to FIGS. 6 and 7, the illustrative impact management system 600 is shown positioned in a cavity 602 at least partially defined by a body 604 of the vehicle 100 (see FIG. 6) and coupled to the frame structure 700 with the body 604 and the wheels 120 omitted for the sake of simplicity (see FIG. 7). As mentioned above, the impact management system 600 includes the crash cage 610 that extends in the longitudinal direction 140 from the ends 706, 708 of the rails 702, 704 to the forward-most point 170 of the vehicle 100. In the illustrative embodiment, the crash cage 610 includes a post assembly 620, a post assembly 640, a lower crash assembly 650, an upper crash assembly 670, an outrigger structure 690, and an outrigger structure 694, among other things, as described in greater detail below. The impact management system 600 extends in a vertical direction 606 between a lower end 608 and an upper end 610.

The illustrative post assembly 620 includes, or otherwise defines, a four-bar linkage 722 that is aligned with the rail 702 in the longitudinal direction 140 at the end 706 of the rail 702. In the illustrative embodiment, the post assembly 620 includes an upright inner post 724, an upright outer post 726, an upper link 728, and a base link 730. The upright inner post 724 is directly affixed to the rail 702 at the end 706 thereof. The upright outer post 726 is spaced from the upright inner post 724 in the lateral direction 212 such that the outer post 726 is located outwardly of the inner post 724 in the lateral direction 212. The upper link 728 extends in the lateral direction 212 from the inner post 724 to the outer post 726. The base link 730 extends in the lateral direction 212 from the upright outer post 726 to an upright outer post 746 of the post assembly 640. The base link 730 is illustratively positioned vertically beneath the upper link 728 relative to a support surface (e.g., the ground) on which the land vehicle 100 is positioned. The upright inner post 724, the upright outer post 726, the upper link 728, and the base link 730 illustratively cooperate to at least partially define the four-bar linkage 722.

The illustrative post assembly 640 includes, or otherwise defines, a four-bar linkage 742 that is aligned with the rail 704 in the longitudinal direction 140 at the end 708 of the rail 704. In the illustrative embodiment, the post assembly 640 includes an upright inner post 744, an upright outer post 746, an upper link 748, and the base link 730. The upright inner post 744 is directly affixed to the rail 704 at the end 708 thereof. The upright outer post 746 is spaced from the upright inner post 744 in the lateral direction 212 such that the outer post 746 is located outwardly of the inner post 744 in the lateral direction 212. The upper link 748 extends in the lateral direction 212 from the inner post 744 to the outer post 746. The base link 730 is illustratively positioned vertically beneath the upper link 748 relative to a support surface on which the land vehicle 100 is positioned. The upright inner post 744, the upright outer post 746, the upper link 748, and the base link 730 illustratively cooperate to at least partially define the four-bar linkage 742.

In the illustrative embodiment, the lower crash assembly 650 at least partially defines the lower end 608 of the impact management system 600. The illustrative crash assembly 650 includes a lower beam or crash tube 752, a lower beam or crash tube 758, a crossbar 764, a crossbar 766, a strut 768, and a strut 770. Those components of the crash assembly 650 are described in greater detail below.

The illustrative lower beam 752 is directly affixed to the upright inner post 724 of the post assembly 620. The lower beam 752 extends parallel to the rail 702 in the longitudinal direction 140 and is aligned with the rail 702 in the vertical direction 606. The lower beam 752 extends in the longitudinal direction 140 from an end 754 coupled to the inner post 724 to an end 756 arranged adjacent the forward-most point 170 of the vehicle 100.

The illustrative lower beam 758 is spaced from the beam 752 in the lateral direction 212 and directly affixed to the upright inner post 744 of the post assembly 640. The lower beam 758 extends parallel to the rail 704 in the longitudinal direction 140 and is aligned with the rail 704 in the vertical direction 606. The lower beam 758 extends in the longitudinal direction 140 from an end 760 coupled to the inner post 744 to an end 762 arranged adjacent the forward-most point 170 of the vehicle 100.

The illustrative crossbar 764 extends in the lateral direction 212 between the lower beams 752, 758 and interconnects the lower beams 752, 758. The illustrative crossbar 766 also extends in the lateral direction 212 between the lower beams 752, 758 and interconnects the lower beams 752, 758. The crossbar 766 is positioned rearward of the crossbar 764 in the longitudinal direction 140.

The illustrative strut 768 is affixed to the lower beam 752 and the crossbar 766. More specifically, the strut 768 is affixed to the lower beam 752 and the crossbar 766 such that the strut 768 is arranged oblique to the lower beam 752. The illustrative strut 770 is affixed to the lower beam 758 and the crossbar 766. More specifically, the strut 770 is affixed to the lower beam 758 and the crossbar 766 such that the strut 770 is arranged oblique to the lower beam 758.

In the illustrative embodiment, the upper crash assembly 670 is positioned above the lower crash assembly 650 in the vertical direction 606. The illustrative crash assembly 670 includes an upper beam 772, an upper beam 774, a crash wall 776, a vertical support 778, and a vertical support 780. Those components of the crash assembly 670 are described in greater detail below.

The illustrative upper beam 772 is directly affixed to the upright inner post 724 of the post assembly 620. The upper beam 772 extends parallel to the rail 702 in the longitudinal direction 140 and is arranged vertically above the rail 702 in the vertical direction 606. The upper beam 772 is interconnected with the lower beam 752 by the vertical support 778. The vertical support 778 is illustratively arranged in the longitudinal direction 140 between the crossbars 764, 766.

The illustrative upper beam 774 is spaced from the beam 772 in the lateral direction 212 and directly affixed to the upright inner post 744 of the post assembly 640. The upper beam 774 extends parallel to the rail 704 in the longitudinal direction 140 and is arranged vertically above the rail 704 in the vertical direction 606. The upper beam 774 is interconnected with the lower beam 758 by the vertical support 780. The vertical support 780 is illustratively arranged in the longitudinal direction 140 between the crossbars 764, 766.

The illustrative crash wall 776 extends in the lateral direction 212 between the upper beams 772, 774 to interconnect the beams 772, 774. In the illustrative embodiment, the crash wall 776 is arranged in the longitudinal direction 140 adjacent the forward-most point 170 of the vehicle 100. In some embodiments, the crash wall 776 may be coupled to, and provide an interconnection between, the outrigger structures 690, 694 adjacent the forward-most point 170 of the vehicle 100.

The illustrative outrigger structure 690 is at least partially arranged outwardly of the lower crash assembly 650 and the upper crash assembly 670 in the lateral direction 212. In the illustrative embodiment, the outrigger structure 690 extends from the upright outer post 726 of the post assembly 620 to an end 782 of the crash wall 776 that is located adjacent the upper beam 772. The illustrative outrigger structure 690 is shaped to define an arc 792 between the upright outer post 726 and the end 782 of the crash wall 776. At least in some embodiments, the outrigger structure 690 is configured for deformation in response to forces applied to the vehicle 100 in a direction generally perpendicular to, and not parallel to, the longitudinal direction 140 during an impact event (e.g., a side collision).

The illustrative outrigger structure 694 is at least partially arranged outwardly of the lower crash assembly 650 and the upper crash assembly 670 in the lateral direction 212. In the illustrative embodiment, the outrigger structure 694 is arranged opposite the outrigger structure 690 and extends from the upright outer post 746 of the post assembly 640 to an end 784 of the crash wall 776 that is located adjacent the upper beam 774. The illustrative outrigger structure 694 is shaped to define an arc 796 between the upright outer post 746 and the end 784 of the crash wall 776. At least in some embodiments, the outrigger structure 694 is configured for deformation in response to forces applied to the vehicle 100 in a direction generally perpendicular to, and not parallel to, the longitudinal direction 140 during an impact event (e.g., a side collision).

In the illustrative embodiment, the crash cage 610 of the impact management system 600 includes a reinforcement brace 786 that is coupled between the upper beam 772 of the upper crash assembly 670 and the outrigger structure 690. More specifically, the reinforcement brace 786 extends outwardly in the lateral direction 212 and upwardly in the vertical direction 606 from the upper beam 772 to the outrigger structure 690 to interconnect the upper beam 772 and the outrigger structure 690. At least in some embodiments, the reinforcement brace 786 is configured for deformation in response to forces applied to the vehicle 100 in a direction generally perpendicular to, and not parallel to, the longitudinal direction 140 during an impact event (e.g., a side collision).

In the illustrative embodiment, the crash cage 610 of the impact management system 600 includes a reinforcement brace 788 that is coupled between the upper beam 774 of the upper crash assembly 670 and the outrigger structure 694. More specifically, the reinforcement brace 788 extends outwardly in the lateral direction 212 and upwardly in the vertical direction 606 from the upper beam 774 to the outrigger structure 694 to interconnect the upper beam 774 and the outrigger structure 694. At least in some embodiments, the reinforcement brace 788 is configured for deformation in response to forces applied to the vehicle 100 in a direction generally perpendicular to, and not parallel to, the longitudinal direction 140 during an impact event (e.g., a side collision).

Referring now to FIG. 8, the illustrative vehicle 100 is depicted next to a stationary structure 800 immediately prior to occurrence of an impact event between the vehicle 100 and the structure 800. In a state 802 of the vehicle 100 shown in FIG. 8, no components of the impact management system 600 have been deformed. Therefore, the impact management system 600 is depicted in FIG. 8 in similar fashion to the depiction of the system 600 in FIG. 7. In the state 802 of the vehicle 100, at least in some embodiments, the vehicle 100 may be traveling at a reference crash test speed, such as 30 miles/hour, for example.

Figure 9:
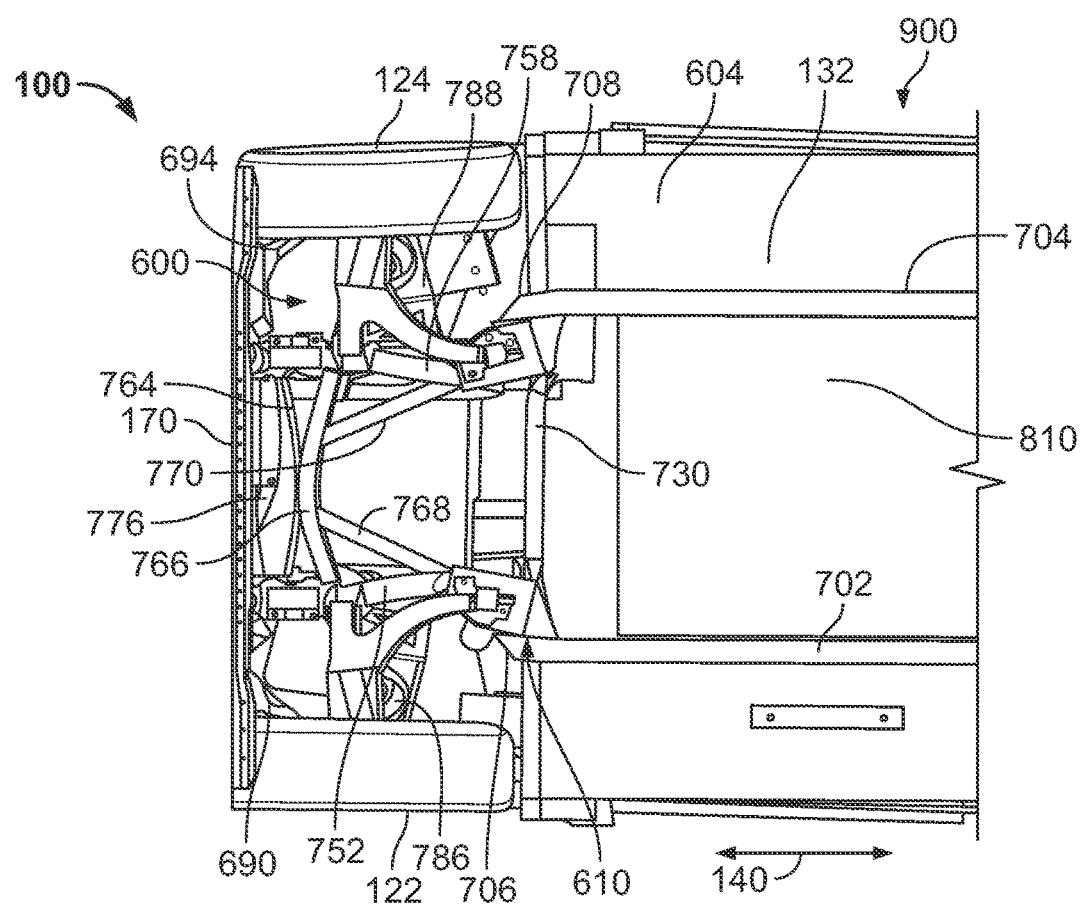
FIG. 9 is a bottom perspective view similar to FIG. 8 showing the vehicle at rest after impact between the vehicle and the stationary structure.

Referring now to FIG. 9, the illustrative vehicle 100 is depicted in a state 900 thereof following the impact event between the vehicle 100 and the stationary structure 800. In the state 900, the vehicle 100 is illustratively at rest. A number of components of the impact management system 600 have been at least partially deformed in the illustrative state 900 of the vehicle 100. Such components include, among others, the lower beams or crash tubes 752, 758, the outrigger structures 690, 694, the crossbars 764, 766, the crash wall 776, the struts 768, 770, and the linkages 722, 742.

As evident from FIG. 9, in the illustrative state 900 of the vehicle 100, minimal or relatively minimal deformation of the components positioned rearward of the illustrative crash cage 610 in the longitudinal direction 140 (i.e., the rails 702, 704, the operator cage 132, and the power cell assembly 810) has occurred. It should be appreciated, therefore, that the illustrative impact management system 600 is configured to, at least in some embodiments, substantially isolate the rails 702, 704, the operator cage 132, and the power cell assembly 810 from impact forces applied and/or transmitted to the impact management system 600 during an impact event. Furthermore, it should be appreciated that in at least some embodiments, the illustrative impact management system 600 is capable of isolating the aforementioned components from impact forces during head-on collisions and/or during side collisions proximate the system 600 in use of the vehicle 100.

Figure 10:
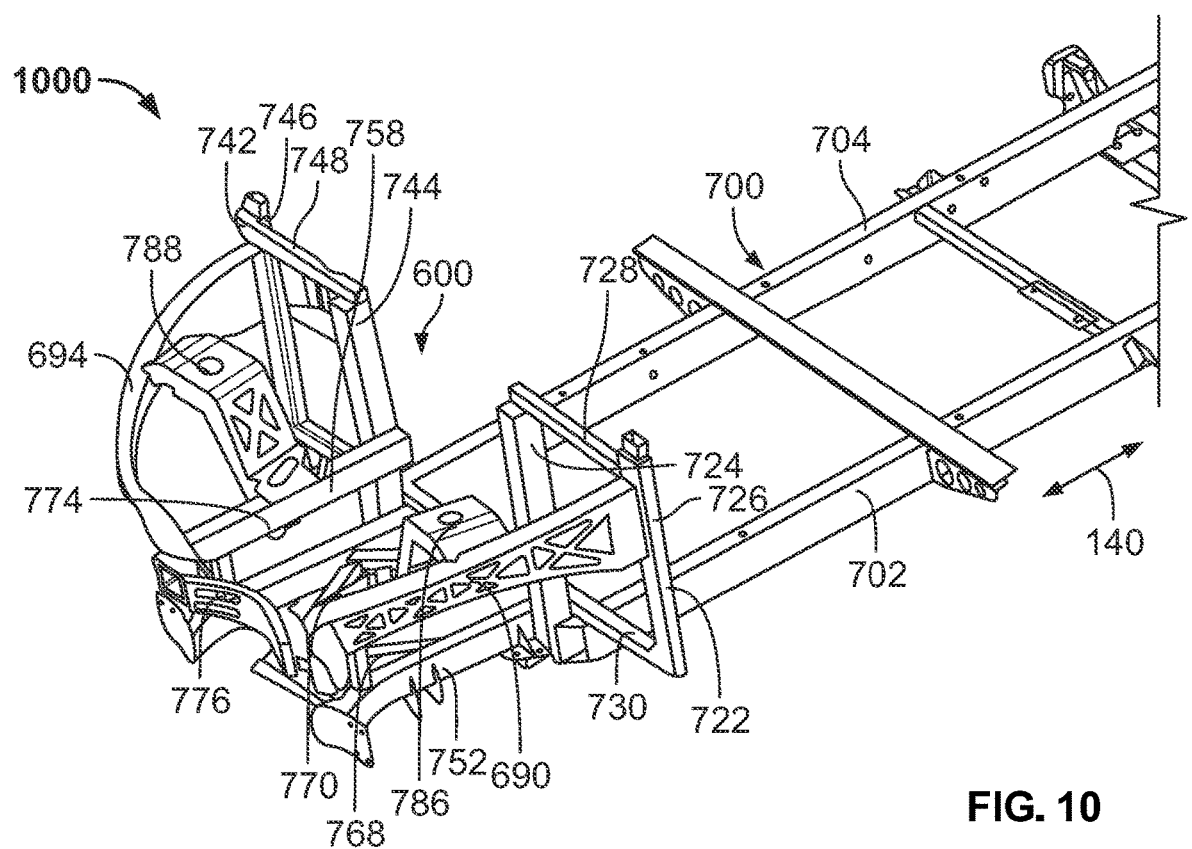
FIG. 10 is a front perspective view showing the impact management system and the frame structure of the electric vehicle in one state after impact between the vehicle and the stationary structure shown in FIG. 8.

Referring now to FIG. 10, the illustrative impact management system 600 and the frame structure 700 coupled thereto are depicted in a state 1000 with other elements of the vehicle 100 (e.g., the wheels 122, 124, the body 604, and the power cell assembly 810) omitted for the sake of simplicity. In some embodiments, the illustrative state 1000 of the vehicle 100 corresponds to an instance of time subsequent to the time instance associated with the illustrative state 802 of the vehicle 100. Additionally, in some embodiments, the illustrative state 1000 corresponds to an instance of time subsequent to the time instance associated with the illustrative state 802 and prior to the time instance associated with the illustrative state 900. In one example, the illustrative state 1000 corresponds to a time instance of 0.03 seconds after the time instance associated with the illustrative state 802. In another example, the illustrative state 1000 corresponds to a time instance of 0.04 seconds before the time instance associated with the illustrative state 900.

As shown in FIG. 10, a number of components of the impact management system 600 have been at least partially deformed, or are in the process of undergoing at least partial deformation, in the illustrative state 1000 of the vehicle 100. Such components include, among others, the lower beams or crash tubes 752, 758, the outrigger structures 690, 694, the crossbars 764, 766, the crash wall 776, the struts 768, 770, and the base link 730. However, in the illustrative state 1000, minimal or relatively minimal deformation of the components positioned rearward of the linkages 722, 724 in the longitudinal direction 140 (i.e., the rails 702, 704) has occurred. Additionally, minimal or relatively minimal deformation of the linkages 722, 742 of the post assemblies 620, 640 has occurred in the illustrative state 1000 of the vehicle 100.

Figure 11:
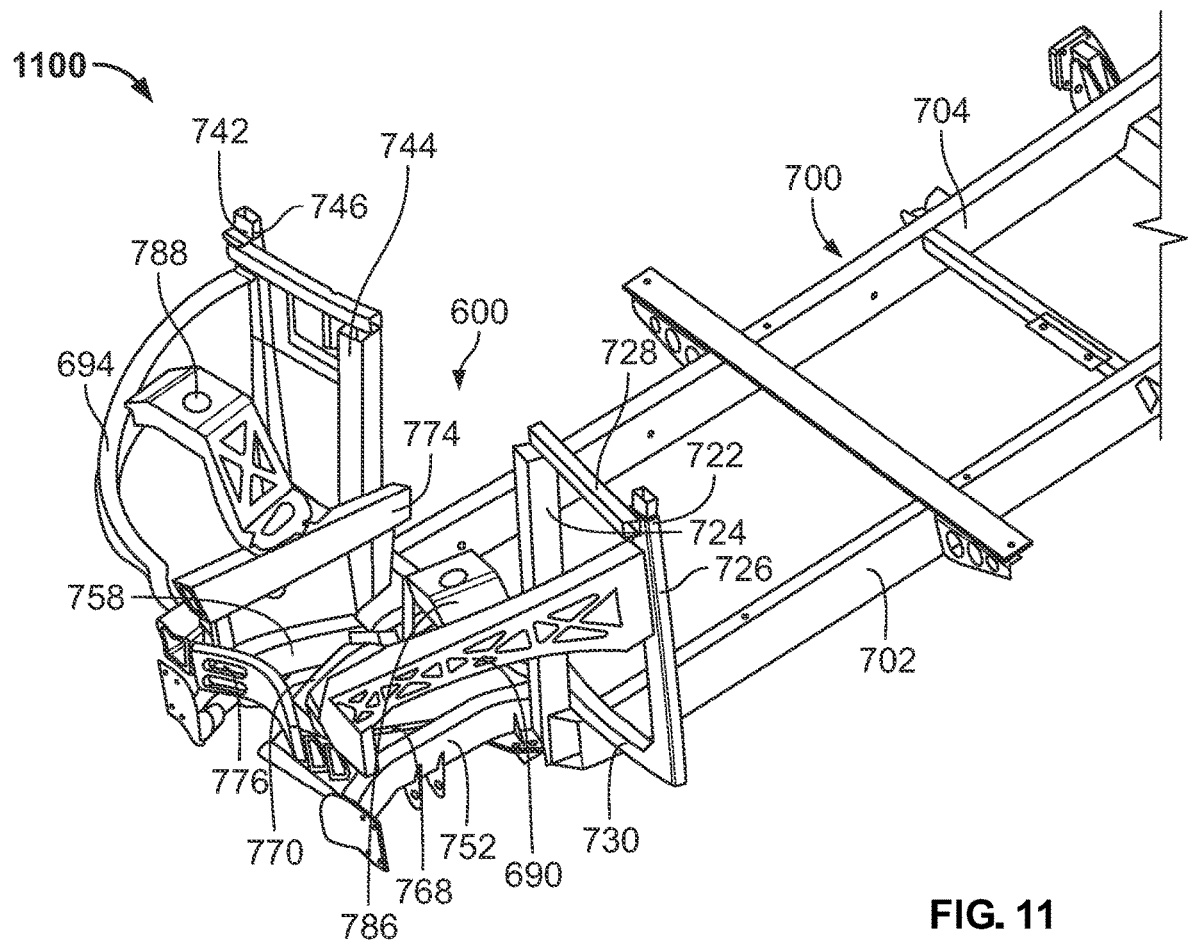
FIG. 11 is a front perspective view similar to FIG. 10 showing the impact management system and the frame structure of the electric vehicle in another state after impact between the vehicle and the stationary structure.

Referring now to FIG. 11, the illustrative impact management system 600 and the frame structure 700 coupled thereto are depicted in a state 1100 with other elements of the vehicle 100 (e.g., the wheels 122, 124, the body 604, and the power cell assembly 810) omitted for the sake of simplicity. In some embodiments, the illustrative state 1100 of the vehicle 100 corresponds to an instance of time identical to the time instance associated with the illustrative state 900 of the vehicle 100. In one example, the illustrative states 900, 1100 correspond to a time instance of 0.04 seconds after the time instance associated with the illustrative state 1000. In another example, the illustrative states 900, 1100 correspond to a time instance of 0.07 seconds after the time instance associated with the illustrative state 802.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric vehicle comprising:
a frame structure including a pair of rails that each extends in a longitudinal direction;
at least one electric motor supported by the frame structure to generate rotational power to drive movement of the electric vehicle; and
an impact management system supported by the frame structure that is configured to deform in response to impact forces applied thereto in use of the electric vehicle to maintain structural integrity of the pair of rails,
wherein:

the impact management system includes a crash cage having a pair of upright outer posts each arranged outward of a corresponding one of the pair of rails in a lateral direction perpendicular to the longitudinal direction, each of the pair of upright outer posts extends perpendicular to the corresponding one of the pair of rails, the crash cage includes a first outrigger structure that extends from a first upright outer post of the pair of upright outer posts to a crash wall located adjacent a forward-most point of the vehicle to define a first arc between the first upright outer post and the crash wall, the crash cage includes a second outrigger structure that extends from a second upright outer post of the pair of upright outer posts to the crash wall to define a second arc between the second upright outer post and the crash wall, and each of the first outrigger structure and the second outrigger structure is formed to include a plurality of voids.

2. The electric vehicle of claim 1, wherein:

the first outrigger structure extends from the first upright outer post to a first end of the crash wall, and the second outrigger structure extends from the second upright outer post to a second end of the crash wall that is opposite the first end.

3. The electric vehicle of claim 1, wherein the first outrigger structure defines a first outermost structure of the crash cage in the lateral direction.

4. The electric vehicle of claim 3, wherein:

the second outrigger structure defines a second outermost structure of the crash cage in the lateral direction, and the first and second outermost structures are arranged opposite one another.

5. The electric vehicle of claim 1, wherein:

the crash cage includes a pair of upright inner posts each directly affixed to a corresponding one of the pair of rails and each arranged to extend perpendicular to the corresponding one of the pair of rails, a first upright inner post of the pair of upright inner posts is arranged inward of the first upright outer post in the lateral direction, and a second upright inner post of the pair of upright inner posts is arranged inward of the second upright outer post in the lateral direction.

6. The electric vehicle of claim 5, wherein the first upright inner post is at least partially offset from the corresponding one of the pair of rails in the lateral direction.

7. The electric vehicle of claim 6, wherein the second upright inner post is at least partially offset from the corresponding one of the pair of rails in the lateral direction.

8. The electric vehicle of claim 1, wherein:

the crash cage includes a first lower beam coupled to one of the pair of rails and arranged to extend parallel to the one of the rails in the longitudinal direction; and the first lower beam is offset from the one of the pair of rails in the lateral direction.

9. The electric vehicle of claim 8, wherein:

the crash cage includes a second lower beam coupled to the other of the pair of rails and arranged to extend parallel to the other of the pair of rails in the longitudinal direction; and the second lower beam is offset from the other of the pair of rails in the lateral direction.

10. An electric vehicle comprising:

a frame structure including a pair of rails that each extends in a longitudinal direction;

at least one electric motor supported by the frame structure to generate rotational power to drive movement of the electric vehicle; and an impact management system supported by the frame structure that is configured to deform in response to impact forces applied thereto in use of the electric vehicle to maintain structural integrity of the pair of rails, wherein the impact management system comprises:

a pair of upright outer posts each arranged outward of a corresponding one of the pair of rails in a lateral direction perpendicular to the longitudinal direction, a first outrigger structure that extends from a first upright outer post of the pair of upright outer posts to a crash wall located adjacent a forward-most point of the vehicle to define a first arc between the first upright outer post and the crash wall, a second outrigger structure that extends from a second upright outer post of the pair of upright outer posts to the crash wall to define a second arc between the second upright outer post and the crash wall, a first upper beam coupled to one of the pair of rails and arranged above the one of the pair of rails in a vertical direction, a second upper beam coupled to the other of the pair of rails and arranged above the other of the pair of rails in the vertical direction, a first reinforcement brace coupled in the lateral direction between the first outrigger structure and the first upper beam, and a second reinforcement brace coupled in the lateral direction between the second outrigger structure and the second upper beam.

11. The electric vehicle of claim 10, wherein:

the first outrigger structure extends from the first upright outer post to a first end of the crash wall, and the second outrigger structure extends from the second upright outer post to a second end of the crash wall that is opposite the first end.

12. The electric vehicle of claim 10, wherein the first outrigger structure defines a first outermost structure of the impact management system in the lateral direction.

13. The electric vehicle of claim 12, wherein:

the second outrigger structure defines a second outermost structure of the impact management system in the lateral direction, and the first and second outermost structures are arranged opposite one another.

14. The electric vehicle of claim 10, wherein the first upper beam is at least partially offset from the one of the pair of rails in the lateral direction.

15. The electric vehicle of claim 14, wherein the second upper beam is at least partially offset from the other of the pair of rails in the lateral direction.

16. The electric vehicle of claim 10, wherein the impact management system comprises a pair of upright inner posts each directly affixed to a corresponding one of the pair of rails and each arranged to extend perpendicular to the corresponding one of the pair of rails.

17. The electric vehicle of claim 16, wherein:

a first upright inner post of the pair of upright inner posts is arranged inward of the first upright outer post in the lateral direction, and a second upright inner post of the pair of upright inner posts is arranged inward of the second upright outer post in the lateral direction.

18. The electric vehicle of claim 17, wherein the first upright inner post is at least partially offset from the corresponding one of the pair of rails in the lateral direction.

19. The electric vehicle of claim 18, wherein the second upright inner post is at least partially offset from the corresponding one of the pair of rails in the lateral direction.

20. An electric vehicle comprising:
- a frame structure including a pair of rails that each extends in a longitudinal direction;
- at least one electric motor supported by the frame structure to generate rotational power to drive movement of the electric vehicle; and
- an impact management system supported by the frame structure that is configured to deform in response to impact forces applied thereto in use of the electric vehicle to maintain structural integrity of the pair of rails, wherein the impact management system comprises:
- a pair of upright outer posts each arranged outward of a corresponding one of the pair of rails in a lateral direction perpendicular to the longitudinal direction,
- a first outrigger structure that extends from a first upright outer post of the pair of upright outer posts to a crash wall located adjacent a forward-most point of the vehicle to define a first arc between the first upright outer post and the crash wall, and
- a second outrigger structure that extends from a second upright outer post of the pair of upright outer posts to the crash wall to define a second arc between the second upright outer post and the crash wall, wherein the first outrigger structure defines a first outermost structure of the impact management system in the lateral direction and the second outrigger structure defines a second outermost structure of the impact management system in the lateral direction, and wherein each of the first outrigger structure and the second outrigger structure is formed to include a plurality of voids.

* * * * *